(12) United States Patent
Kober et al.

(10) Patent No.: US 11,802,816 B2
(45) Date of Patent: Oct. 31, 2023

(54) METHOD, APPARATUS AND HOUSEHOLD APPLIANCE FOR DETERMINING A STATE OF A HOUSEHOLD APPLIANCE

(71) Applicant: BSH Hausgeraete GmbH, Munich (DE)

(72) Inventors: Christoph Kober, Otterfing (DE); Christoph Soellner, Munich (DE); Klaus-Martin Forst, Dillingen (DE)

(73) Assignee: BSH Hausgeraete GmbH, Munich (DE)

( * ) Notice: Subject to any disclaimer, the term of this patent is extended or adjusted under 35 U.S.C. 154(b) by 196 days.

(21) Appl. No.: 17/335,469

(22) Filed: Jun. 1, 2021

(65) Prior Publication Data

US 2021/0381930 A1 Dec. 9, 2021

(30) Foreign Application Priority Data

Jun. 5, 2020 (DE) .......................... 102020207051.2
Oct. 2, 2020 (DE) .......................... 102020212506.6

(51) Int. Cl.
*G06F 11/30* (2006.01)
*G01M 99/00* (2011.01)
*A47J 31/52* (2006.01)

(52) U.S. Cl.
CPC ......... *G01M 99/005* (2013.01); *A47J 31/521* (2018.08)

(58) Field of Classification Search
CPC .................................................. G01M 99/005
See application file for complete search history.

(56) References Cited

U.S. PATENT DOCUMENTS

2019/0235484 A1 8/2019 Ristovski et al.

FOREIGN PATENT DOCUMENTS

| CN | 107893308 B | | 1/2020 |
|---|---|---|---|
| DE | 202005004382 U1 | | 6/2005 |
| DE | 102011083103 | * | 3/2013 |
| DE | 102011083103 A1 | | 3/2013 |
| DE | 102012223249 A1 | | 6/2014 |
| JP | 2012058932 A | | 3/2012 |

* cited by examiner

*Primary Examiner* — Phuong Huynh
(74) *Attorney, Agent, or Firm* — Laurence A. Greenberg; Werner H. Stemer; Ralph E. Locher

(57) ABSTRACT

A method for determining a usability of a household appliance includes scanning operating information of the household appliance, determining stresses of different components of the household appliance on the basis of the operating information, and of determining the usability of the household appliance on the basis of the stresses determined and of predetermined stress functions for the components. Wherein a stress function maps a stress determined to a remaining stress capacity.

15 Claims, 5 Drawing Sheets

METHOD, APPARATUS AND HOUSEHOLD APPLIANCE FOR DETERMINING A STATE OF A HOUSEHOLD APPLIANCE

CROSS-REFERENCE TO RELATED APPLICATION

This application claims the priority, under 35 U.S.C. § 119, of German patent application DE 10 2020 212 506.6, filed Oct. 2, 2020 and DE 10 2020 207 051.2, filed Jun. 5, 2020; the prior application is herewith incorporated by reference in its entirety.

BACKGROUND OF THE INVENTION

Field of the Invention

The invention relates to the determination of a state of a household appliance. In particular, the invention relates to the determination of a degree of usability of a household appliance or of a degree of usability of components of the household appliance.

A household appliance contains a number of components, which within the framework of the use of the household appliance are each subjected to a stress. The components are usually dimensioned and procured in such a way that they outlast a predetermined operating life of the household appliance without any problems. However, the stress capacity of each component is not unlimited, so that the household appliance, with continued use, will exhibit a defect at some point. Furthermore, a component can be faulty or be stressed beyond its specification, so that it possibly becomes defective earlier than other components. A few components can be configured as wear parts that have to be replaced at regular intervals. For example, it can be recommended that a water filter in a coffee machine be replaced after a specific volume of water has passed through it. If this is not done the result can be damage, to a heating element for the water for example.

Published, non-prosecuted German patent application DE 10 2012 223 249 A1 proposes that a warning of the danger of a failure of a household appliance be provided on a basis of a deviation of appliance parameters from previously stored appliance parameters.

A household appliance can be used in different ways. Appliance parameters set, consumable material or wear material used or lengths of periods of use or periods of standby can have an influence on how reliably or for how long the household appliance can continue to be operated. For example, in the case of an appliance being sold, an overall state of the appliance can be of interest. Even if a defect occurs in a component, a decision as to whether the household appliance is to be replaced or repaired can be made dependent on its overall state.

BRIEF SUMMARY OF THE INVENTION

An object underlying the present invention is to specify an improved technique for determining the usability of a household appliance. The invention achieves this object by means of the subject matter of the independent claims. Dependent claims reproduce preferred forms of embodiment.

According to a first aspect of the present invention a method for determining a usability of a household appliance and/or a usability of components of the household appliance includes steps of scanning operating information of the household appliance; of determining stresses on various components of the household appliance on the basis of the operating information; and of determining the usability of the household appliance and/or the usability of components of the household appliance on the basis of the stresses determined and predetermined stress functions for the components. A stress function maps a specific stress of a component to its remaining stress capacity.

The usability preferably relates to a functioning household appliance. In accordance with the invention the usability can specify a measure of how long or how intensively the household appliance or a component of the household appliance is likely still to be able to be used or operated. The usability can take account of a price of obtaining or repairing the household appliance and specify a current residual value of the appliance. To determine the usability an operation-related stress, which relates in particular to wear on a component, and a time-related stress, which relates to an ageing of a component, can be taken into account. A stress function can apply to a component or to the entire household appliance. With the aid of the stress functions various stress capacities of the household appliance can be made comparable, so that the usability can be realistically determined in an improved manner.

The usability can comprise a value on a predefined one-dimensional scale. The scale can have predefined limits, of which one can represent a state of the household appliance when new and another can represent a state in which an imminent failure of at least one component of the household appliance must be expected. The scale can be linear between the limits as regards a predefined variable such as a period of use, a number of uses or a residual value. In one form of embodiment the scale extends between the values of 1 and 10, wherein a high value preferably indicates a high remaining usability.

The usability can however also be established for a household appliance that is no longer capable of functioning. This enables it to be established which components possess a sufficient residual life to make it possible to use the respective component as a used replacement part.

In one form of embodiment of the method it is determined that the household appliance has a predetermined usability if specific stress capacities of the components exceed predetermined threshold values. The usability can be assigned a number of threshold values, which can each relate to a component or to the household appliance as a whole. Only when the stress capacities of all components exceed the threshold value assigned to them in each case can the predetermined usability be fulfilled. Fulfillment of a predetermined usability can be expressed by a quality seal, which can be given to the household appliance. In one form of embodiment a predetermined guarantee promise for the household appliance can be given if it fulfills a predetermined usability. In this way the household appliance can be supplied for further use as a certified used appliance for example. Premature disposal of the household appliance can be prevented and resources for manufacturing of the household appliance can be preserved.

In one form of embodiment a number of usabilities of the household appliance can be predetermined; wherein for the predetermined usabilities threshold values for the stress capacities of the components of the household appliance are predetermined in each case. The predetermined usabilities can build on one another, in that a household appliance that has a higher predetermined usability also fulfills all the requirements for having a lower usability. To this end in particular the threshold values for the remaining stress capacities of the components for the predetermined usabilities can build on one another. The predetermined usabilities can represent discrete points on the scale mentioned above.

A component can be determined, of which the stress determined prevents a higher usability being achieved by the household appliance. In other words, it can be determined which component has already been so greatly stressed that its remaining stress capacity prevents the household appliance being classified as achieving a higher predetermined usability. The determination is particularly useful if only one or only a few components are less capable of being stressed than the remaining components. A user can better decide whether a service measure on one component can improve the overall state of the household appliance. This can be of importance for example when buying or selling the used appliance.

The stress of a component can take account of a distribution of uses over time. In particular, it can be taken into account that a newly inserted component has a greater tendency to fail than one that has already functioned for a certain time. This effect is also called burn-in. If the component then continues to be used, its probability of failure again increases. It can further be taken into account that specific components can be stressed by not being used. Thus, for example, a seal can dry out, a bearing can start to become slightly rusty or plastic can become porous. If a component is used evenly over a longer period, this can lead to a lower stress than when it is used just as often over a short period. Moreover combinations of stresses can be taken into consideration. A valve can be stressed by pressure or temperature; a stress by pressure and temperature can be greater than the sum of the individual stresses.

The stress of a component can be determined while taking account of a maintenance or service measure carried out. For example a remaining stress capacity of a component can be increased by such a measure. The service measure can for example comprise cleaning, oiling, descaling, adjusting, checking, preserving, refilling, topping up or replacement of operating materials or consumables or replacing a wear part. The measure can be carried out by a user, by them using a machine cleaner for example, or by a service engineer, who can if necessary, also open or dismantle the household appliance.

Two externally identical household appliances can differ in the components that they comprise. A stress function is preferably assigned to a component installed in the household appliance. The stress function can in particular take into consideration the batch or series or the lot from which the component originates, the version of the component that is present or when and how often the component has already been replaced or serviced. The stress function can also take into account a component that has been selected, adapted or calibrated individually for the household appliance.

A threshold value for a component can be determined on the basis of collected information about stresses and failures of a comparable component in a plurality of comparable household appliances. In particular operating and wear information about the household appliances can be collected and analyzed in order to determine the threshold value. A failure of a component can be determined automatically or by a person. A person, in particular trained service personnel, can likewise make an assessment as to whether a component must be regarded as worn out. In one form of embodiment samples of household appliances can be investigated as to their state or remaining stress capacity of components that they include.

In a similar way a stress function for a component can also be determined on the basis of collected information about stresses and failures of a comparable component in a plurality of comparable household appliances.

In one form of embodiment the usability determined is provided on the household appliance, in the form of a permanent or retrievable display for example. The determination of the usability can be safeguarded in such a way that influencing a displayed value is rendered difficult. To this end in particular methods of cryptography can be used, namely the cryptographic signing of information. The usability can be determined in the household appliance itself or by an external location. The external location can be connected permanently or intermittently to the household appliance. The information can be stored in the external location or in the household appliance and exchanged when a communication link is available.

If the usability is determined by the external location and/or if the information is stored there, then the information can also still be interrogated when the household appliance is not connected or is no longer capable of functioning. The external location can preferably be realized in the form of a database, which can be reached over the Internet for example.

The present invention can possess particular advantages in the context of recycling or in the sense of management of recycling. In a few countries there is already a legal obligation to offer customers used spare parts in the case of a repair. In this way used spare parts that are still able to function, which would otherwise simply have been scrapped, are to be returned to the market in order to generate less waste and act in a commercially resource-saving way. This should above all serve to protect the environment.

Against this background it can in particular be of interest to household appliance manufacturers to take back used household appliances for a charge or even free-of-charge, to break them down into their components and to classify the components individually in respect in their (re-)usage. A first class can for example consist of components, which in their existing form are worn out and which therefore cannot be further used. Components of this class should be dismantled as single types in order too then recover the materials contained within them. For example, melting and re-use of steel comes into consideration. A second class can consist of components, which are able to be reused after processing. Certain filters, which would have to be deep cleaned, are thought of here. A third class can consist of components, which can still be readily re-used, since they still have a long service life, such as e.g. washing drums.

In order to be able to decide which components are to be assigned to which class, various parameters can be employed. For example, the date of manufacture of the household appliance can be of interest. If the date of manufacture is a long time ago, it is rather unlikely that certain components are able to be re-used. Above and beyond this it is a legal obligation in many countries, even after production of a household appliance model has ended, still to retain spare parts for a certain number of years. When the household appliance belongs to a household appliance model for which spare parts no longer have to be retained, it can be that re-use is economically unattractive. Sometimes however people are very happy to be able to obtain spare parts for very old well-loved models. The age of a component alone is however frequently not decisive for its re-usability. As has already been explained above, for that reason it can be attractive to know how many operating hours the components have run for and how frequently they have been serviced, how frequently for example the aforementioned maintenance or service measures have been carried out.

In the sense of the recycling management discussed above it can naturally also occur that a household appliance manufacturer receives back relatively new household appliances, for which just a few components have to be exchanged or refurbished, before the household appliance can be offered as a used (and refurbished) household appliance. This can occur for example in conjunction with leasing of household appliances.

According to a second aspect of the present invention, an apparatus for determination of the usability of a household appliance and/or the usability of components of the household appliance contain a scanning facility for scanning of operating information of the household appliance and a processing facility. In this case the processing facility is configured to determine stresses of various components of the household appliance on the basis of the operating information and to determine the usability of the household appliance and/or the usability of components of the household appliance on the basis of the stresses determined and predetermined stress functions for the components. In this case a stress function maps a stress of a component determined to its remaining stress capacity.

The processing facility can be configured to carry out a method described herein entirely or in part. To this end the processing facility can comprise a programmable microcomputer or microcontroller and the method can be present in the form of a computer program product with program code means. The computer program product can also be stored on a computer-readable data medium. Features or advantages of the method can be transferred to the apparatus and vice versa.

According to yet another aspect of the present invention a household appliance comprises an apparatus described herein. The apparatus can be configured to control the household appliance or can be connected for communication to a controller configured for this purpose.

A further method contains steps of acquisition of operating information of a plurality of household appliances, wherein the household appliances each comprise a number of predetermined components; of acquisition of appraisals of a remaining stress capacity of components of the household appliances; and of provision of a stress function, which determines a remaining stress capacity of a component with regard to a stress of the component that has previously occurred.

In a corresponding way a threshold value for a remaining stress capacity can also be determined, wherein the threshold value is assigned to a predetermined usability of the household appliance. Preferably stress functions and/or threshold values are determined at the same time for a number of components of the household appliance.

Other features which are considered as characteristic for the invention are set forth in the appended claims.

Although the invention is illustrated and described herein as embodied in a state determination for a household appliance, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
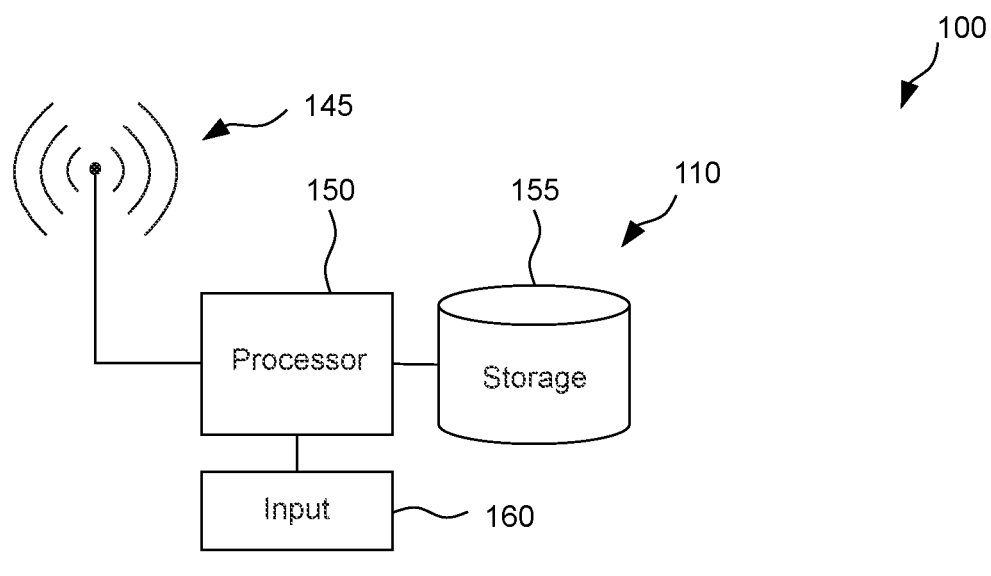
FIG. 1 is an illustration of a system with a household appliance.
Figure 1:
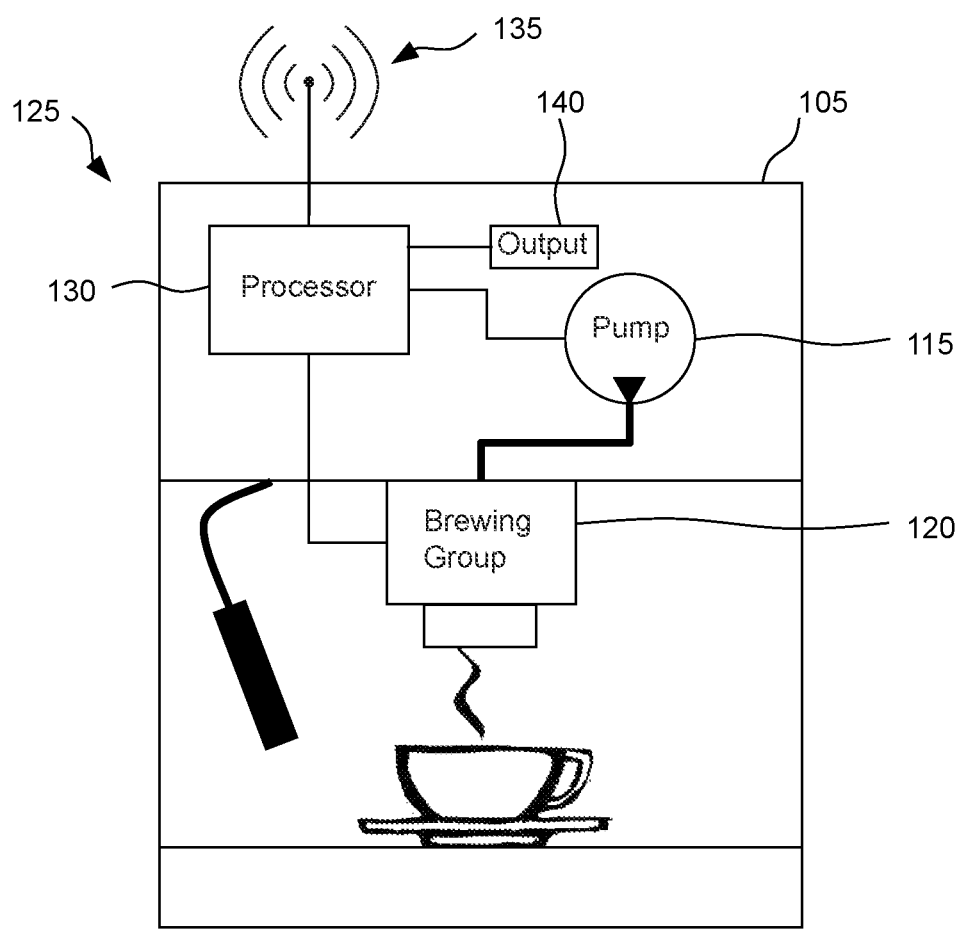

Referring now to the figures of the drawings in detail and first, particularly to FIG. 1 thereof, there is shown system 100 with a household appliance 105 and an optional external location 110. The household appliance 105 is preferably configured for operation in a household or office, in particular in a kitchen, and can for example comprise a dishwasher, an extractor hood, a hob, an oven, a mixer, a toaster, a hand mixer, but also a vacuum cleaner or a window cleaner. The household appliance 105 can be configured, for processing a predetermined task, to be autonomously mobile in the household. In the exemplary form of embodiment shown the household appliance is embodied as a coffee machine.

The household appliance 105 usually contains a plurality of components, wherein in the present example only a first component 115 embodied as a liquid pump and a second component 120 embodied as brewing group are shown. A number of components 115, 120 can be grouped together in a module, which can likewise be regarded as a component 115, 120. In this sense the entire household appliance 105 can also be seen as component 115, 120.

The household appliance 105 further contains a control apparatus 125, which is configured to process information about the components 115, 120. To this end the control apparatus 125 preferably contains a processing facility 130. The control apparatus 125 can be connected to at least a few of the components 115, 120 or to a control apparatus not shown, which is configured to control a function of the household appliance by controlling at least a few of the components 115, 120. As an alternative a sensor can also be provided for determination of operating information. The control apparatus 125 preferably contains a communication facility 135, which, as shown, can operate wirelessly or also with a wired connection, as well as further preferably an output facility 140. In the present case the output facility 140 is embodied by way of example as an optical display, which can also be used for example to display a state or an operating element of the household appliance 105. Other output facilities 140, for acoustic or haptic output for example, are likewise possible.

The control apparatus 125 is configured to determine stresses of the components 115, 120 and, by means of predetermined, assigned stress functions, to determine a remaining stress capacity of the components 115, 120. From these a remaining usability of the household appliance 105 can then be determined and provided for example by means of the output facility 140 on the household appliance 105. Processing steps connected with these determinations can be carried out by the local processing facility 130 or by the external location 110. If end-to-end communication between the control apparatus 125 and the external location 110 is not possible, then information can be stored in order to be transferred at another time. In yet another form of embodiment the information can be recorded by a mobile device and forwarded to the external location 110. The mobile device can be service device for example that a service technician can connect to the facility during service or analysis of the household appliance 105. In a further form of embodiment the device is not mobile and can be provided in a workshop for example in which the household appliance 105 can be serviced. The device can communicate with the external location 110 or can be designed to be integrated with the latter.

The external location 110 preferably contains a communication facility 145 and a processing facility 150. Moreover, a storage facility 155 or an input facility 160 can be provided. The external location 110 is preferably configured to receive and to process information of a plurality of household appliances 105. In particular the location 110 can receive information about observed stresses of components 115, 120 of the household appliances 105. Moreover, information about a state or failure of a component 115, 120 can be determined. This information can be determined by the control facilities 125 of the household appliances or by entering it by means of the input apparatus 160. The input apparatus 160 can be used for example by a user of the household appliance 105 or by a service person. In one form of embodiment the input apparatus 160 is embodied as a service, which can be used as a type of server or a cloud via a communication network, in particular the Internet or a mobile radio network.

The location 110 can determine on the basis of received stress and state or failure information from comparable components 115, 120 of household appliances 105 a relationship between the stress and a remaining stress capacity. If a component 115, 120 is stressed beyond the limits of the stress capacity determined, then its failure is likely. The remaining stress capacity can be specified in different units, for example in operating hours, actuations or work performed. In the case of a motors for example, the work can relate to a number of rotations or in the case of a pump to a volume conveyed. The remaining stress capacity can be specified as a fraction of the original stress capacity of the component 115, 120.

Figure 2:
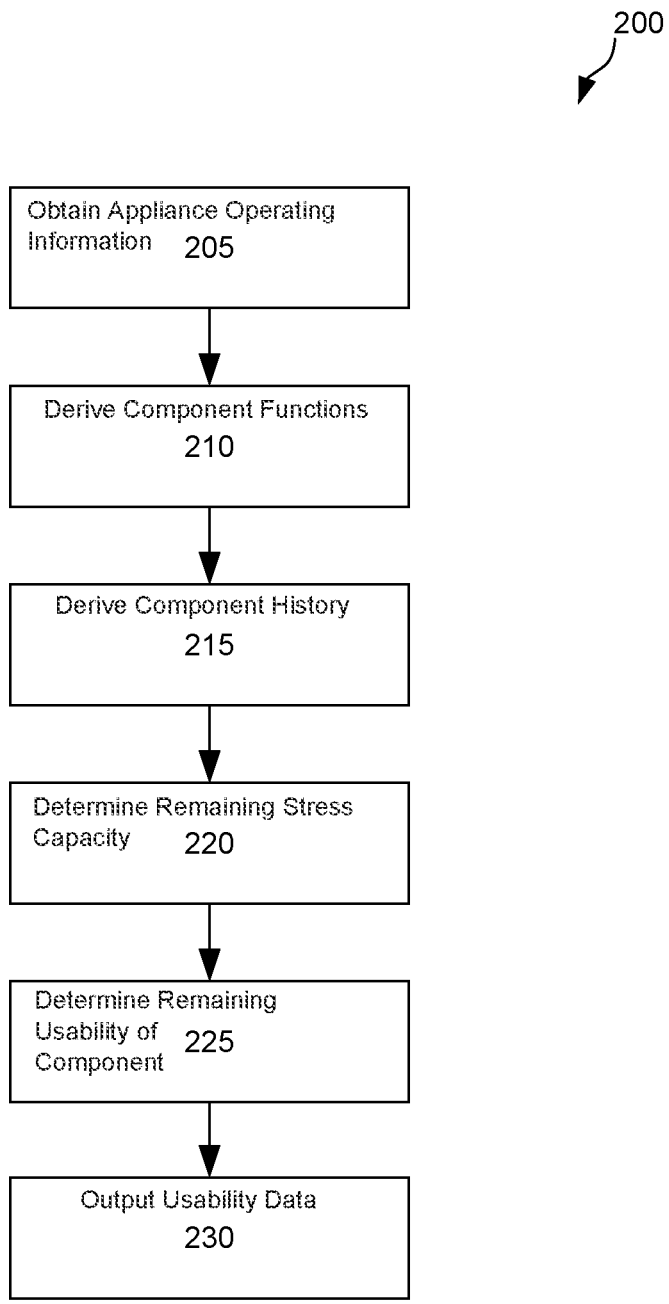
FIG. 2 is a flow diagram of a first method.

FIG. 2 shows a flow diagram of a first method 200, which can be carried out by means of the system 100. The method 200 can be carried out in particular on the control apparatus 125 and/or at the external location 110. In one form of embodiment the process is divided between the two.

In a step 205 operating information of the household appliance 105 is determined. This can in particular comprise a function carried out, a state assumed, a request to the household appliance 105 or a result provided by it.

Further examples of operating information comprise an overall age of the household appliance 105, in particular since it was first put into service or since it was manufactured; an age of a component 115, 120 regardless thereof; a number of operating hours of the household appliance 105, wherein different operating modes such as operation, standby and off can be distinguished; a current strength through a component 115, 120, for example through a motor, a photoresistor or a photodiode; a humidity; a water level; a fill level of a consumable material; vibrations and their frequencies; a response time of a predetermined electronic component 115, 120; a number of times that a door of the household appliance 105 is opened; or an error message reported or an error code.

Further operating information can be collected or determined indirectly. For example, a run time of a component 115, 120 can be determined; an operating hours counter of the household appliance 105 can be read out; a failure or a malfunction can be detected. An error can also be deduced from existing information. For example, it can be determined that an operating element is not functioning when repeated user interactions are detected for the same function. Moreover, information can be provided by a person for example as part of a customer service deployment.

Functions of individual components 115, 120 of the household appliance 105 can be derived from this information in a step 210 or be determined directly. The operating or function information can be assigned to times or periods of time in each case. The function information can be extensive for example, when a time curve of a control of a motor, a valve or a pump is acquired for example. To fulfill a predetermined function of the household appliance 105, in the example shown in FIG. 1 for preparation of coffee by the coffee machine 105, a complex interaction between components 110, 115 can be controlled, wherein function information can occur. It is preferable for only specific function information to be recorded and the other information discarded. Then, on the basis of this information a stress on a component 115, 120 that has occurred can be determined.

In a step 215 a history of a component 115, 120 can be determined. For example, it can be determined whether an originally installed component 115, 120 is involved, whether or when this was serviced or replaced, in which version it is present, or which previous stresses are known. By means of a predetermined stress function, in a step 220, a remaining stress capacity of the component 115, 120 can be determined. In this case a projected or empirically determined maximum stress capacity of the component 115, 120 can be used as the basis. The stress capacity can reach the value of zero if a function of the component 115, 120 can no longer be provided with a predetermined quality. The quality can comprise a power or an error rate for example. For example, a pushbutton can be determined as no longer being capable of withstanding stress when it wrongly detects 10 of 1000 actuations.

In this determination individual features of a component 115, 120 being observed can be taken into account. The features can be determined in particular within the framework of manufacturing or service of a component 115, 120. In one form of embodiment manufacturing information of the household appliance 105 is able to be determined on the basis of an identification of the household appliance 105 from a database, which in particular can be available at the external location 110.

Such features can for example comprise meta information of a component 115, 120 such as a date of manufacture or a type series; an expected service life of a component 115, 120, for example in the form of a number of possible actuations of a pushbutton or a Mean-Time-To-Failure (MTTF) for an electronic component 115, 120. Further information can concern a resistance of a component 115, 120 to environmental influences, any vibration or temperature fluctuations, in particular when the component 115, 120 has an electrical or mechanical connection within the household appliance 105. A calibration parameter, which has been defined within the framework of manufacturing can also be taken into consideration. A parameter, which was determined during a final acceptance of the manufactured household appliance 105 or of one of its components 115, 120 can further be considered.

In a step 225 a remaining usability of the household appliance 105 can be determined on the basis of the remaining stress capacities of predetermined, components 115, 120 included. The household appliance 105 can only fulfill a predetermined usability when the remaining stress capacities of all predetermined components 115, 120 exceed assigned threshold values in each case. The usability can be expressed on a predetermined scale. In a step 230 the usability determined can be provided, for example to the output apparatus 140 of the household appliance 105 or to the external location 110.

Figure 3:
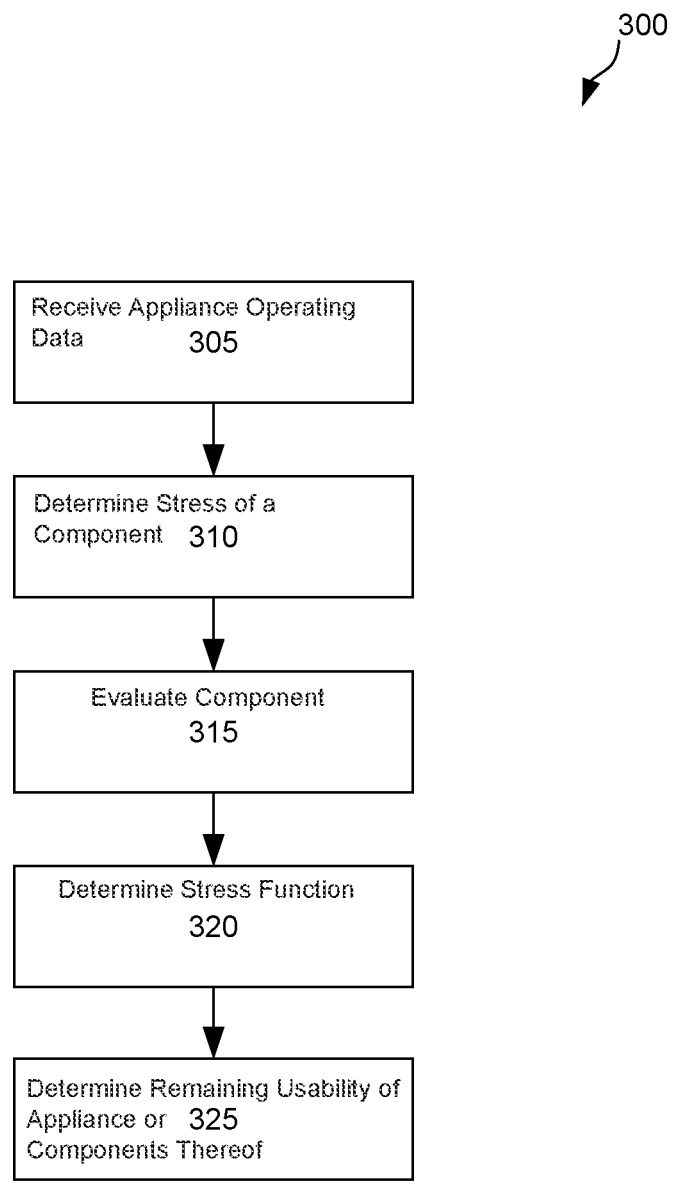
FIG. 3 is a flow diagram of a second method.

FIG. 3 shows a flow diagram of a second method 300, which can be carried out in conjunction with the system 100 and in particular by the external location 110. The object of the method 300, from experiences with the operation of a plurality of household appliances 105, is to derive measures of assessment for their evaluation. In particular it is to be made possible, on the basis of a stress of a component 115, 120 of a household appliance determined, for a remaining stress capacity of the component 115, 120 to be determined. Threshold values for the remaining stress capacities of the components 115, 120 of a household appliance 105 are further to be determined, which must be exceeded in order to attest that the household appliance has 105 a predetermined usability. To this end the threshold values of the components 115, 120 should be matched to each other where possible.

In a step 305 operating information of a household appliance 105 can be received. This information can in particular comprise determinations of the step 205 of the method 200 on the household appliance 105. In a step 310 a stress of a component 115, 120 included in the household appliance 105 can be determined. This step can also be carried out as step 210 by the household appliance 105, wherein a determination result is transferred to the external location 110. The steps 305 and 310 are usually carried out very frequently. Information arising during them can be stored.

In a step 315 an evaluation of a component 115, 120 can be determined. The evaluation can be determined automatically and can relate to a failure, a performance or an error rate of the component 115, 120. The evaluation can also be acquired in the form of an input that a person can undertake, which the household appliance 105 or one of its components 115, 120 evaluates.

In a step 320, on the basis of information determined about comparable components 115, 120, a stress function for these components 115, 120 is determined. In particular it can be determined with statistical means or by means of machine learning, which stress the component 115, 120 usually withstands before it is classified as defective or no longer sufficiently capable. In this case different stresses can be taken into account, which for example can comprise a service life in the household appliance 105 and a number of actuations. A relationship between a stress and a remaining stress capacity can be provided in the form of a stress function.

In a step 325 stress functions for components 115, 120 of a household appliance 105 can be reconciled with one another or harmonized with one another in order to allow the determination of a remaining usability of the household appliance 105. In this case threshold values for the individual remaining stress capacities are determined that correspond to a predetermined usability. If a household appliance 105, of which the components 115, 120 reach the threshold values, continues to be used, then the remaining stress capacities of the components 115, 120 should reduce in at least roughly equal measures. A number of usage capabilities can be predetermined to which a set of threshold values can be assigned in each case.

Figure 4:
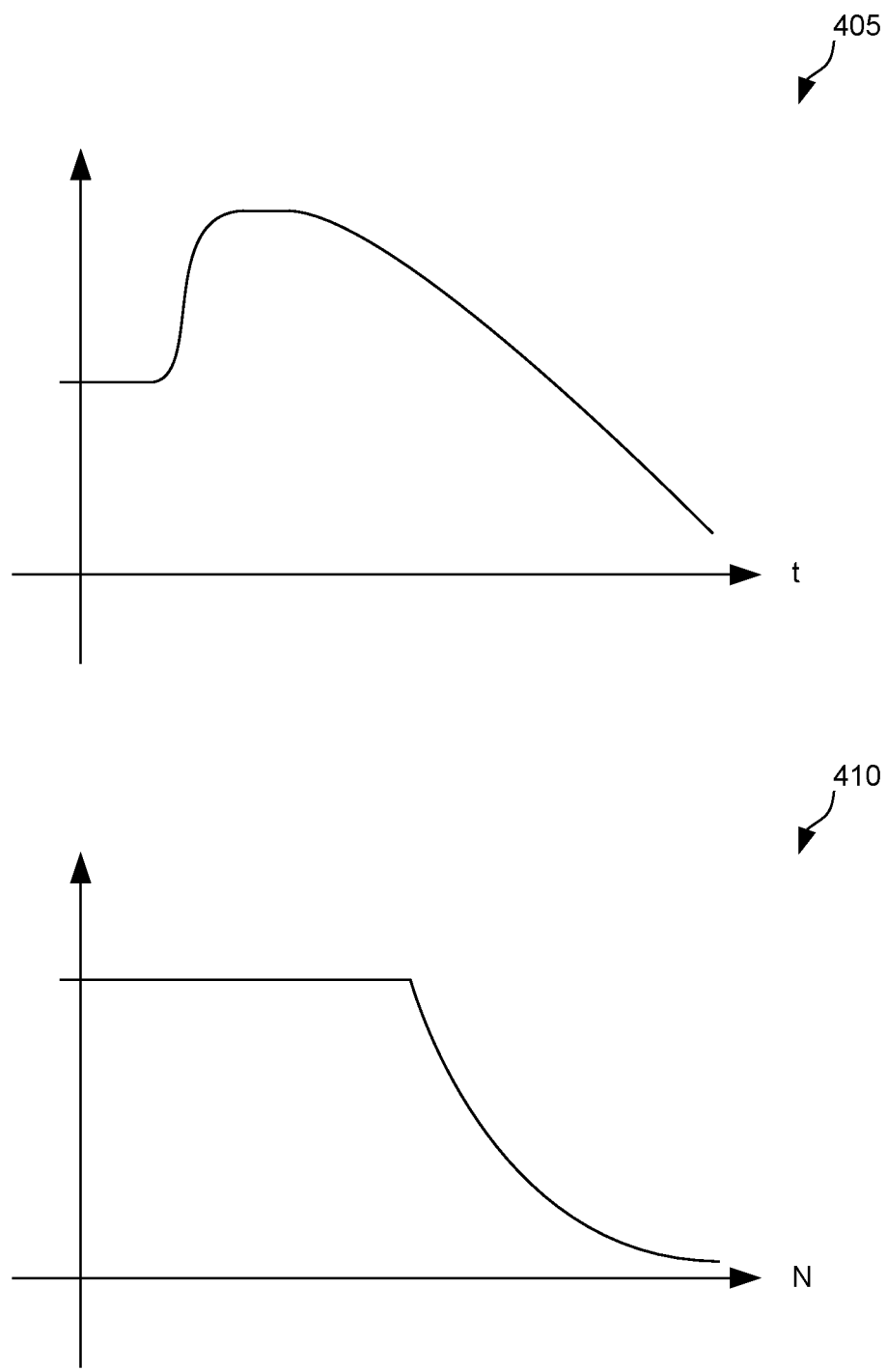
FIG. 4 is an illustration of graphs showing examples of stress curves.

FIG. 4 shows examples of stress curves of a fictional component 115, 120 of a household appliance 105.

A first curve 405 relates to stress on the component 115, 120 over time. Plotted in the horizontal direction is a time and in the vertical direction a remaining stress capacity. The time can be set as the operating time. At the beginning of the curve 405 the remaining stress capacity of component 115, 120 is mid-level. Its use thus has a mid-level damaging or wearing effect on the component 115, 120. After a little time the stress rises and after for example around 400 hours approaches a maximum. This effect is known from electronic circuits for example, which after their manufacture initially exhibit an increased risk or failure and thereafter work very reliably. Later the stress capacity of the component 115, 120 can fall approximately linearly in the direction of zero. To put it another way, its operation can damage a component 115, 120 ever more heavily or cause it to wear, the older the component 115, 120 already is.

A second curve 410 relates to a stress of a component 115, 120 by actuation. Plotted in the horizontal direction is the overall number of actuations that has occurred and in the vertical direction a remaining stress capacity of the component 115, 120 is shown. The component 115, 120 considered can for example comprise a pushbutton or switch. Up to a predetermined value the actuation can practically not stress the component 115, 120. When this value is reached, the remaining stress capacity can fall as a function of the stress—i.e. the actuation—in a predetermined way. In the present example the fall is essentially exponential in the manner of a decay function.

The way in which the component 115, 120 is actuated can also be taken into consideration. Should the component 115, 120 be actuated very frequently not distributed over time but concentrated within a short period of time, then the second curve 410 can for example be compressed in the horizontal direction, so that the aforementioned value lies further to the left.

Figure 5:
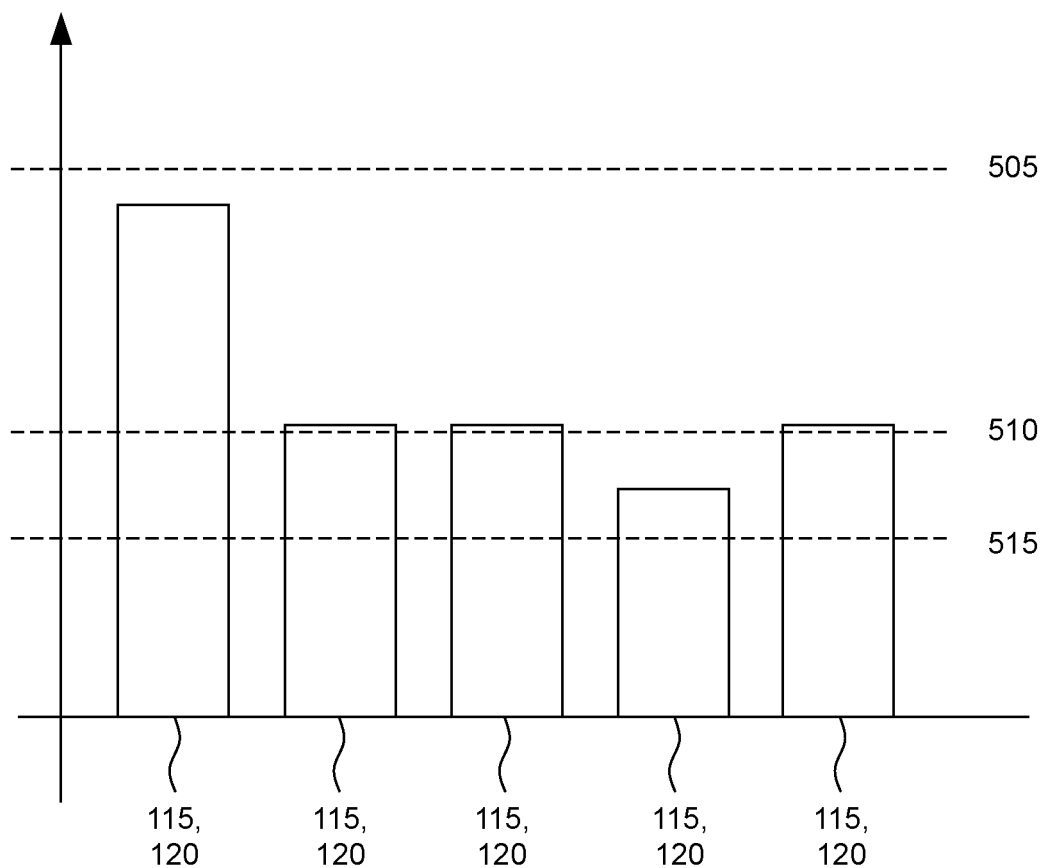
FIG. 5 is a bar graph showing examples of predetermined remaining usabilities for a household appliance.

FIG. 5 shows examples of predetermined remaining usabilities for a household appliance 105 as a function of determined stress capacities of components 115, 120 included. In the present case the starting point is five relevant components 115, 120 for example, which are to be evaluated. Indicated in the vertical direction is a usability of the household appliance 105. For example, three usabilities are predetermined, which the household appliance 105 can achieve. Each of the predetermined usabilities is shown by a threshold value in the form of an interrupted horizontal line. A first predetermined usability ("gold") is assigned to an upper threshold value 505, a second predetermined usability ("silver") to a middle threshold value 510 and a third predetermined usability ("bronze") to a lower threshold value 515. It should be noted that in other forms of embodiment other threshold values 505-515 or other usabilities can be set and that in each case any given number thereof can be used.

The components 115, 120 of the household appliance 105 shown, with one exception, achieve the middle threshold value 510. Since however the highest threshold value 505-515 that all components 115, 120 exceed is the lower threshold value 520, only an overall usability of "bronze" is achieved. Even the fact that one of the components 115, 120 far exceeds the middle threshold value 510 and almost reaches the upper threshold value 505 does not change this in any way.

It should be noted that in the example shown the threshold values 505-515 for the individual components 115, 120 have been reconciled with one another by suitable stress functions. In a further form of embodiment a component 115, 120 that is necessary for reaching a higher usability cannot be taken into consideration for reaching a lower usability.

REFERENCE CHARACTERS

100 System
105 Household appliance
110 External location
115 First component
120 Second component
125 Control apparatus
130 Processing facility
135 Communication facility
140 Output facility
145 Communication facility
150 Processing facility
155 Storage apparatus
160 Input facility
200 First method
205 Determine operating information of a household appliance
210 Determine stress of a component
215 Determine history of the component
220 Determine remaining stress capacity of the component
225 Determine usability of the household appliance
230 Determine usability
300 Second method
305 Receive operating information of a household appliance
310 Determine stress of a component
315 Determine evaluation and stress of a component
320 Determine stress function of the component
325 Determine threshold value for remaining stress capacity of the component
405 First curve
410 Second curve
505 Upper threshold value
510 Middle threshold value
515 Lower threshold value

The invention claimed is:

1. A method for determining a usability of a household appliance and/or a usability of components of the household appliance, which comprises the following steps of:
scanning operating information of the household appliance;
determining stresses of different ones of the components of the household appliance on a basis of the operating information;
determining the usability of the household appliance and/or the usability of the components of the household appliance on a basis of the stresses determined and of predetermined stress functions for the components, wherein a stress function maps a stress of a component determined to the remaining stress capacity thereof; and
recycling or refurbishing the household appliance on the basis of the usability of the household appliance and/or the usability of the components of the household appliance made in the determining step.

2. The method according to claim 1, wherein the usability contains a value on a predetermined one-dimensional scale.

3. The method according to claim 1, wherein it is determined that the household appliance fulfils a predetermined usability if specific stress capacities of the components exceed predetermined threshold values.

4. The method according to claim 3, wherein:
a number of usabilities of the household appliance are predetermined; and
for predetermined usabilities, threshold values for the specific stress capabilities of the components of the household appliance are predetermined in each case.

5. The method according to claim 4, wherein the stress of a component is determined to be significant such that the stress prevents the household appliance from fulfilling a further usability.

6. The method according to claim 1, wherein the stress of a component takes into account a distribution of uses over time.

7. The method according to claim 1, wherein the stress of the component is determined by taking into account performed maintenance or service measures.

8. The method according to claim 1, wherein the stress function is assigned to the component installed in the household appliance.

9. A method for determining a usability of a household appliance and/or a usability of components of the household appliance, which comprises the following steps of:
scanning operating information of the household appliance;
determining stresses of different ones of the components of the household appliance on a basis of the operating information;
determining the usability of the household appliance and/or the usability of the components of the household appliance on a basis of the stresses determined and of predetermined stress functions for the components, wherein a stress function maps a stress of a component determined to its remaining stress capacity;
determining that the household appliance fulfils a predetermined usability if specific stress capacities of the components exceed predetermined threshold values; and
a threshold value for the component is determined on a basis of collected information about stresses and failures of a comparable component in a plurality of comparable household appliances.

10. The method according to claim 3, wherein the stress function for the component is determined on a basis of collected information about stresses and failures of a comparable component in a plurality of comparable household appliances.

11. The method according to claim 1, wherein the usability determined is provided at the household appliance.

12. An apparatus for determining a usability of a household appliance and/or a usability of components of the household appliance, the apparatus comprising:
a scanning facility for scanning operating information of the household appliance; and
a processing facility configured for determining stresses of different ones of the components of the household appliance on a basis of the operating information and to determine the usability of the household appliance and/or the usability of the components of the household appliance on a basis of the stresses and predetermined stress functions for the components, a stress function mapping a stress of a component determined to its remaining stress capacity, said processing facility configured for generating a guarantee promise for the appliance for selling the appliance as a certified used appliance for further use.

13. A household appliance, comprising:
an apparatus according to claim 12.

14. A method, which comprises the following steps of:
acquiring operating information of a plurality of household appliances operating in different locations, the household appliances each containing a number of comparable predetermined components;
acquiring evaluations of a remaining stress capacity of the comparable predetermined components of the household appliances; and
providing a stress function, which determines a remaining stress capacity of a component of the comparable predetermined components in relation to a stress of a component that has occurred previously, the stress function for the component being determined on a basis of collected information about stresses and failures of the comparable component in the plurality of household appliances.

15. The method according to claim 9, wherein the stress function for the component is determined on a basis of collected information about stresses and failures of a comparable component in a plurality of comparable household appliances.

\* \* \* \* \*